(12) United States Patent
Zhang et al.

(10) Patent No.: US 8,097,548 B2
(45) Date of Patent: Jan. 17, 2012

(54) HIGH-DENSITY PRESSURELESSLY SINTERED ZIRCONIUM DIBORIDE/SILICON CARBIDE COMPOSITE BODIES AND A METHOD FOR PRODUCING THE SAME

(76) Inventors: Shi C. Zhang, Rolla, MO (US); Gregory E. Hilmas, Rolla, MO (US); William G. Fahrenholtz, Rolla, MO (US)

( * ) Notice: Subject to any disclaimer, the term of this patent is extended or adjusted under 35 U.S.C. 154(b) by 43 days.

(21) Appl. No.: 12/201,704

(22) Filed: Aug. 29, 2008

(65) Prior Publication Data
US 2009/0048087 A1 Feb. 19, 2009

Related U.S. Application Data

(63) Continuation-in-part of application No. 11/419,622, filed on May 22, 2006, now abandoned.

(51) Int. Cl.
*C04B 35/81* (2006.01)
*C04B 35/58* (2006.01)

(52) U.S. Cl. .......... 501/92; 501/95.3; 501/96.3

(58) Field of Classification Search ........ 501/92, 501/95.3, 96.3
See application file for complete search history.

(56) References Cited

U.S. PATENT DOCUMENTS

| | | | |
|---|---|---|---|
| 3,775,137 A | 11/1973 | Clougherty | |
| 4,327,186 A | 4/1982 | Murata | |
| 4,419,161 A | 12/1983 | Hailey | |
| 4,668,643 A | 5/1987 | Kida | |
| 4,705,761 A | 11/1987 | Kosugi | |
| 4,735,923 A | 4/1988 | Sugawara | |
| 4,753,903 A | 6/1988 | Saito | |
| 4,963,516 A | 10/1990 | Kawasaki | |
| 5,030,597 A | 7/1991 | Ogata et al. | |
| 5,082,597 A | 1/1992 | Tashiro | |
| 5,108,965 A | 4/1992 | Tani | |
| 5,135,895 A | 8/1992 | Frechette | |
| 5,470,806 A | 11/1995 | Krstic | |
| 5,505,899 A | 4/1996 | Sigl | |
| 5,527,748 A | 6/1996 | Zank | |
| 5,543,370 A | 8/1996 | Sigl | |
| 5,656,213 A | 8/1997 | Sakaguchi | |
| 5,656,218 A | 8/1997 | Lin et al. | |
| 5,665,661 A | 9/1997 | Matsumoto | |
| 5,750,450 A | 5/1998 | Bull | |
| 5,876,659 A | 3/1999 | Yasutomi | |
| 5,955,390 A | 9/1999 | Mehrotra | |
| 6,204,213 B1 | 3/2001 | Mehrotra | |
| 6,503,572 B1 | 1/2003 | Waggoner et al. | |
| 6,740,286 B2 | 5/2004 | Sutaria | |
| 6,855,428 B2 | 2/2005 | Lau | |
| 2003/0196305 A1 | 10/2003 | Kebbrede | |
| 2004/0180242 A1 | 9/2004 | Oguri | |
| 2005/0142346 A1 | 6/2005 | Omnishi | |
| 2005/0143251 A1 | 6/2005 | Mehrotra | |
| 2005/0230029 A1 | 10/2005 | Vaidyanathan | |

FOREIGN PATENT DOCUMENTS

| | | |
|---|---|---|
| EP | 0303192 | 12/1992 |
| EP | 0301802 | 6/1993 |
| EP | 0771769 | 5/1997 |
| EP | 1481954 | 12/2004 |
| GB | 2023185 | 12/1979 |
| GB | 2078256 | 1/1982 |
| JP | 62230675 | 10/1987 |
| JP | 5270922 | 10/1993 |
| WO | WO-2005123626 | 12/2005 |

*Primary Examiner* — Karl Group
(74) *Attorney, Agent, or Firm* — C. John Brannon

(57) ABSTRACT

A method of sintering a $ZrB_2$—SiC composite body at ambient pressures, including blending a first predetermined amount of $ZrB_2$ powder with a second predetermined amount of SiC powder, wherein both powders are characterized by the presence of surface oxide impurities. Next the blended powders are mixed to yield a substantially homogeneous powder mixture and a portion of the substantially homogeneous powder mixture is formed into a green body. The body is fired to a first temperature, wherein substantially all surface oxide impurities are reduced and/or volatilized to substantially eliminate oxides from the green body, and the body is heated to a second temperature and sintered to yield a composite body of at least about 99 percent theoretical density (more typically at least about 99.5 percent theoretical density) and characterized by SiC whisker-like inclusions distributed substantially evenly in a $ZrB_2$ matrix.

5 Claims, 2 Drawing Sheets

HIGH-DENSITY PRESSURELESSLY SINTERED ZIRCONIUM DIBORIDE/SILICON CARBIDE COMPOSITE BODIES AND A METHOD FOR PRODUCING THE SAME

CROSS REFERENCE TO RELATED APPLICATIONS

This patent application is a continuation-in-part of and claims priority to U.S. patent application Ser. No. 11/419,622 filed on May 22, 2006, now abandoned.

TECHNICAL FIELD

The novel technology herein relates generally to the field of zirconium diboride ceramics, and, more particularly, to a pressurelessly sintered primarily zirconium diboride ceramic body and a method for making the same.

BACKGROUND

Traditionally, zirconium boride and composites thereof, such as zirconium boride/silicon carbide composites, have been fabricated by a hot pressing process. Mixtures of zirconium boride and silicon carbide powders are placed in a pressure vessel and are subjected to elevated pressures while heated to high temperatures, typically in an inert atmosphere or under vacuum. Alternately, $ZrB_2$/SiC composites may be formed by reaction hot pressing precursors such as metallic Zr, Si powders and boron carbide ($B_4C$) powder (instead of SiC and $ZrB_2$ powder precursors). In either technique, the lack of self-diffusion and low driving forces for sintering and densification inherent in the materials is compensated for through the application of high pressures during the sintering step. The high pressures applied to the sintering body contribute sufficient forces such that substantially complete densification of the sintering body may be achieved.

Typically, substantially dense composite bodies are formed as follows. First, the raw material powders are blended and then loaded into a simple geometrical model, such as a graphite die, where the blended raw materials then undergo heating and pressing simultaneously. Although hot pressing is not required per se for the sintering of $ZrB_2$/SiC composites, sintering without the application of elevated pressures results in weak bodies characterized by densities only about 90 percent of theoretical and having poor thermal and mechanical properties. Therefore, the densified bodies so produced are limited by the constraints of the hot pressing die to simple shapes and moderate sizes. Further, hot pressing techniques require expensive hot pressing facilities and provide a slow rate of production. Moreover, the bodies produced by hot pressing techniques are simple and unfinished, thus typically requiring further diamond machining in order to produce a finished end product. Such machining adds considerable time and financial cost.

In the hot pressing processes, the attendant high pressures are necessary to provide sufficient driving force for substantial densification to occur, since the mixed $ZrB_2$ and SiC powders alone lack sufficient self-diffusion characteristics when heated to sintering temperatures. The use of high sintering pressures addresses this problem by providing an externally generated driving force to the system, but also adds complexity and cost to the fabrication of $ZrB_2$/SiC bodies. Further, the application of high pressure adds inherent geometrical constraints that limit the bodies so formed to simple geometric shapes. Thus, there remains a need for a means of fabricating and sintering $ZrB_2$/SiC bodies having complex shapes at ambient pressures. The present novel technology addresses this need.

SUMMARY

The present novel technology relates to a method of sintering $ZrB_2$/SiC bodies at ambient pressures, as well as to control of the microstructure of the so-produced $ZrB_2$/SiC bodies.

One object of the present novel technology is to provide an improved method for producing $ZrB_2$/SiC bodies. Related objects and advantages of the present novel technology will be apparent from the following description.

DESCRIPTION OF THE PREFERRED EMBODIMENTS

Figure 1:
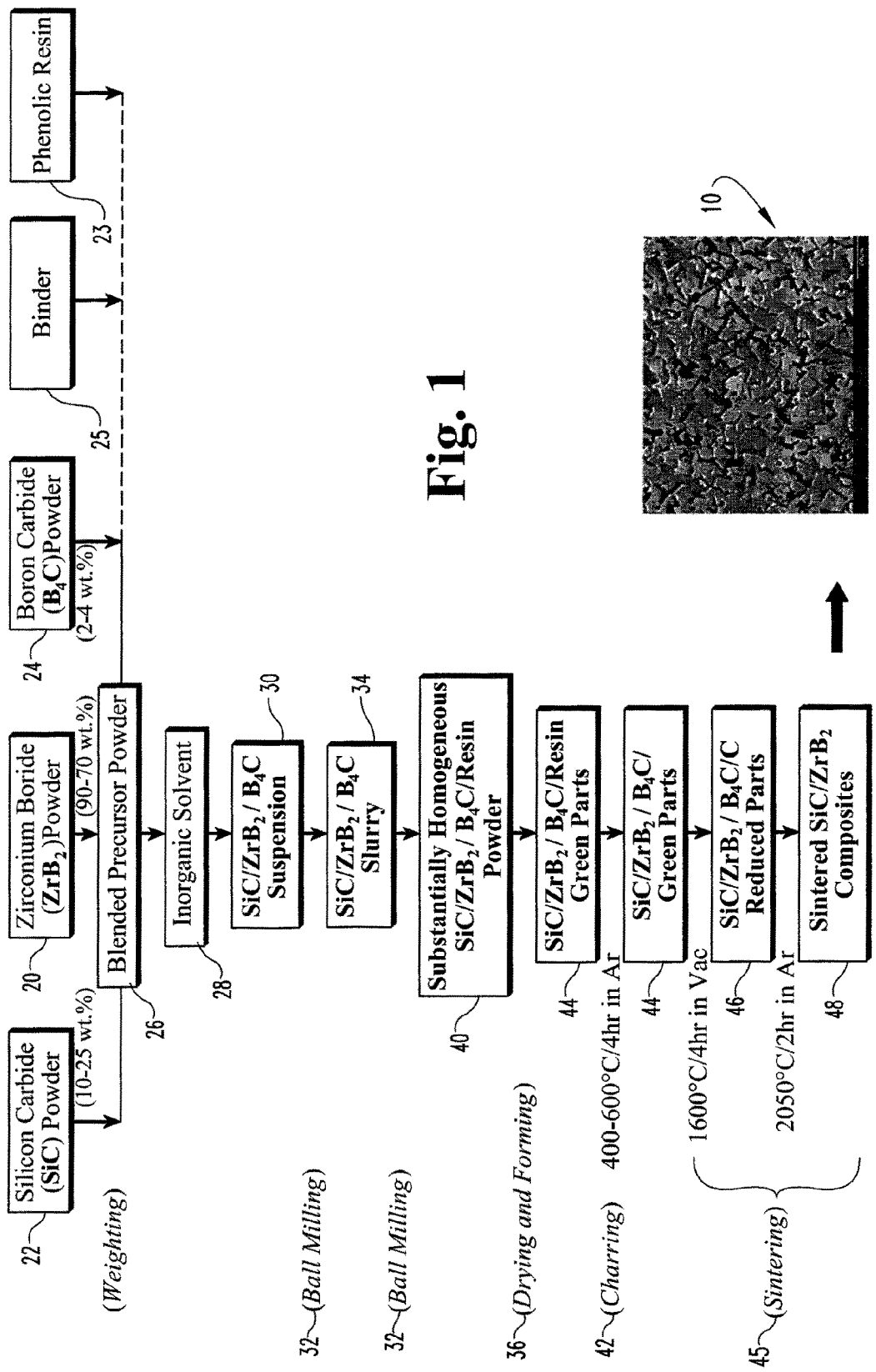
FIG. 1 is a schematic diagram illustrating a method for sintering a $ZrB_2$—SiC composite body to substantially full density without the application of high pressures according to a first embodiment of the present novel technology.

For the purposes of promoting an understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated device and such further applications of the principles of the novel technology as illustrated therein being contemplated as would normally occur to one skilled in the art to which the novel technology relates.

Densified $ZrB_2$/SiC composites are attractive as ultra-high melting point materials that are also characterized as having high strength and hardness, as well as being chemically stable and having relatively high thermal and electrical conductivities. This combination of properties is rare, and thus $ZrB_2$/SiC composites are desired for applications in the aerospace field, as well as in electrode, cutting tool, machining tool, and molten metal containing crucible applications and the like.

Although $ZrB_2$/SiC composite materials may be readily formed and sintered from a combination of the appropriate amounts of blended $ZrB_2$ and SiC powders (or reacted from precursors such as Zr, Si and boron carbide), a significant amount of oxide impurities, especially $SiO_2$ and $ZrO_2$ impurities, are always present as surface impurities in the powders and/or precursor materials. The presence of these oxides promotes non-densifying coarsening mechanisms among the $ZrB_2$ and SiC particles, resulting in a practical upper limit of densification of sintered $ZrB_2$/SiC composites of about 93 percent of theoretical density, thus yielding porous $ZrB_2$/SiC composite bodies with relatively large grain sizes that have only a fraction of the strength, hardness, and like physical and chemical properties that make the composite materials attractive and useful.

Instead of overcoming the low self-diffusion and low driving force for densification inherent in the $ZrB_2$/SiC composites materials through the application of high sintering pressures, the present technique involves reduction and removal of the oxide impurities themselves early in the sintering process. This may be accomplished, for example, through the addition of one or more reducing agents to the Zr- and Si-containing raw materials, such as boron carbide ($B_4C$), loosely bound or free carbon in sufficient quantities to convert $SiO_2$ plus C into SiC plus $CO_2$ and to convert $ZrO_2$ plus $B_4C$ into $ZrB_2$ plus $CO_2$. Other gaseous reaction products, such as CO, SiO and $B_2O_3$ vapor, may also be produced and evolved. These reactions occur at moderately elevated temperatures, wherein the $CO_2$ and other gases so evolved escape the bodies and thus allows for the remaining $ZrB_2$ and SiC grains to sinter to substantially full theoretical density, typically at least about 99.5 percent theoretical. Typically, at least one of the reducing agents is typically free carbon, an organic compound from which carbon is easily released upon heating (such as phenolic resin), or graphite, or may be a carbide material such as $B_4C$, WC, ZrC, HfC, $Mo_2C$, NbC or the like.

FIG. 1 illustrates the process for sintering $ZrB_2$—SiC composite bodies at ambient pressures. In operation, a pressurelessly sintered $ZrB_2$ composite body 10 substantially free of oxide impurities and typically having a composition of between about 1 weight percent to about 40 weight percent SiC with the rest being a substantially $ZrB_2$ matrix may be produced as follows. First, the Zr-, Si- and B-source powders 20, 22, 24 (typically $ZrB_2$, and SiC, but alternately, Zr and Si metal and $B_4C$, or the like), along with smaller amounts of reducing agents 23 (typically C-containing additives such as organic resins and compounds, elemental C, $B_4C$, and other like refractory carbides) and binders 25, are measured in predetermined amounts and then mixed. Typically, between about 2 weight percent and about 25 weight percent SiC, between about 0.1 and about 4 weight percent reducing agent, and, if necessary, between about 1 weight percent and about 5 weight percent binder material are mixed with $ZrB_2$ to produce a substantially homogeneously blended powder precursor mixture 26. In some instances, the reducing agent 23 may also act as a binder 25, such as when the reducing agent 23 is a phenolic resin material. Typically, an organic solvent 28 is added to the mixed powders to form a suspension 30, which may then be further mixed, such as by ball milling 32, to form a substantially homogeneous slurry 34. The slurry 34 may then be dried and a substantially homogenous mixed powder precursor 40 may be recovered.

A portion of the substantially homogeneously blended powder mixture is then separated and formed into a green body 42. If binders and/or resins are present in the green body, the green body is first heated to a temperature sufficient for the binder to volatilize 44, such as about 400 to about 600 degrees Celsius. Binder burnout and/or resin carbonization are typically accomplished in an inert atmosphere.

Next, the temperature is elevated and the green body is "soaked" or allowed to remain at one or more elevated temperatures 46 (such as about 1650 degrees Celsius) for sufficient time for any $B_2O_3$ to volatilize and for the other oxide impurities to react with the present reducing agents (typically carbon or carbon compounds) to produce reaction products (typically carbon dioxide gas and other reaction products); this is typically done in a very low oxygen partial pressure atmosphere such as a flowing, non-oxide gas (such as $H_2$, He, argon, or similar gas mixtures), and more typically in a vacuum or partial vacuum (to encourage evolution and removal of carbon dioxide gas) to produce an oxide-reduced or partially-sintered body. The temperature of the reduced or partially-sintered body is then raised to a temperature sufficient for substantially complete densification to occur in a matter of hours (such as to about 2100 degrees Celsius) 48. The body is then soaked at the elevated temperature for a time sufficient for substantially full densification to occur (such as a temperature of about 2100 degrees Celsius for 2 to 4 hours) to yield a substantially theoretically dense sintered body 10. This final soak is usually done in an inert gas atmosphere.

In one embodiment, a powder system is defined as having a compositional range of between about 2 and about 25 wt. percent SiC with the remainder being $ZrB_2$. Free carbon (typically about 2 wt. percent) is added to the system, typically via dissolved phenolic resin as a carbon precursor, to effectively remove any $SiO_2$, $ZrO_2$ and/or other oxide impurities that may be present. Typically, a small amount of $B_4C$ is also added to the system, such as between about 2 and about 4 wt. percent. More typically, a small amount (typically about 0 to 4 wt. percent) of binder (such as polypropylene carbonate) is likewise added to enhance the pressability of the material.

Typically, fine α-SiC, $B_4C$ and as-received $ZrB_2$ powders in designed volume or mass fraction are dispersed in a non-aqueous solvent 28, such as Methyl Ethyl Ketone (MEK). The suspension 30 is typically mixed 32, such as by ball milling, planetary mixing, or attrition milling for a predetermined amount of time (typically about 24 hours for ball milling with WC milling media). A free carbon source 23, such as 2 wt. percent phenolic resin, based on the total weight of $ZrB_2$ and SiC, is added to the mixture followed by further mixing 32 (such as ball milling for an additional 24 hours). If mixing was done in slurry form, the slurry is then dried 36 to yield a powder mixture 40. The powder mixture 40 is typically ground and sieved to yield agglomerates of the powder mixture. This could also be accomplished by a spray drying technique. The agglomerates are then formed into green bodies 44, such as by uni-axial pressing and/or cold isostatic pressing (CIP) in molds of a desired shape. Pressing 38 is typically done at 40-50 Kpsi. The green bodies 44 may alternately be formed through other known techniques, such as via injection molding, extrusion, slip casting or the like to produce more complex shapes by those skilled in the art.

The green bodies 44 typically undergo binder burnout/resin carbonization 42 through exposure to sufficiently elevated temperatures in a low oxygen or inert gas atmosphere for sufficient time to substantially completely volatilize the present binder material (such as in flowing Ar at 400 degrees Celsius to about 600 degrees Celsius for 2-4 hours). Binder burnout/resin carbonization 42 is typically followed by pressureless sintering 45 (more typically in a graphite furnace) at a sufficiently elevated temperature (typically at least about 2050 degrees Celsius) for a time sufficient to achieve theoretical or near-theoretical density (such as about 4 hours at 2050 degrees Celsius).

The sintering process 45 is more typically divided into two stages 46, 48. The first stage 46 is a reaction period that may be defined as the temperature range from room temperature to about 1650 degrees Celsius under vacuum. In this stage 46, oxide impurities are removed from the system. Once the oxide impurities are substantially removed from the system, the second stage may be initiated. The second stage 48 is a sintering period that may be typically defined by the temperature range from about 1650 degrees Celsius to the final sintering temperature (typically about 2050° C. or higher). The second stage 48 typically occurs in the presence of an inert gas atmosphere at ambient pressures, such as one provided by flowing Ar.

Figure 2:
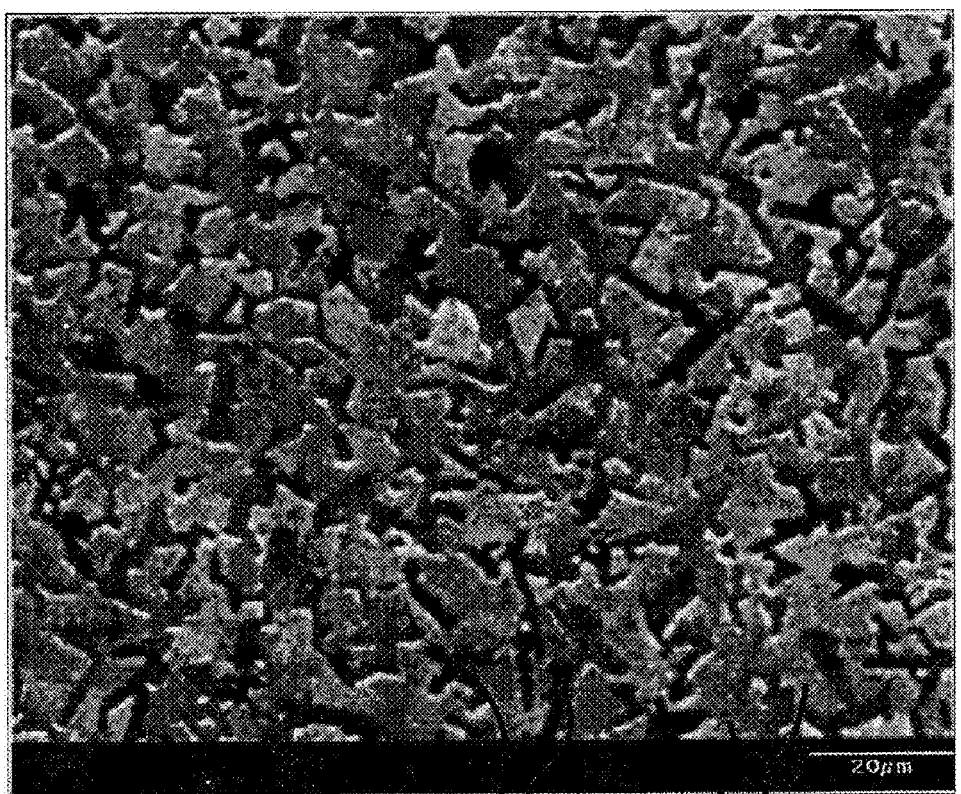
FIG. 2 is a photomicrograph of one embodiment of the present novel technology, a $ZrB_2$—SiC composite body characterized by SiC whisker-like inclusions substantially evenly distributed in a $ZrB_2$ matrix.

After the second stage 48 is complete, the sintered bodies 10 have substantially achieved near theoretical density. Further, the microstructure of the sintered bodies 10 can be varied such that the morphology of the SiC particles can be more or less "whisker like" α-SiC inclusions 50 (i.e., the α-SiC inclusions 50 may have shapes ranging from acicular to equiaxial) that are uniformly distributed in a $ZrB_2$ matrix 52. FIG. 2 shows a ZrB2 matrix 52 having substantially uniformly dispersed α-SiC whisker-like inclusions 50 therein. In this example, the SiC inclusions 50 are typically between 15 and 20 μm in length, and are more generally about 20 μm in length.

According to one aspect of the present novel technology, a method of producing substantially dense $ZrB_2$—SiC composite materials 10 without the use of applied pressures during sintering, or otherwise hot pressing, generally includes the steps of:

(a) mixing between about 2 weight percent and about 25 weight percent SiC powder 22, between about 0.1 and about 4 weight percent reducing agent 23, and about 1 weight percent to about 5 weight percent binder material 25 with $ZrB_2$ powder 20 to produce a substantially homogeneously blended powder precursor mixture 40, wherein oxide impurities are present in the SiC and $ZrB_2$ powders 22, 20;

(b) forming 38 a portion of the substantially homogeneously blended powder precursor mixture into a green body 44;

(c) heating 42 the green body 44 to a temperature in the range of about 400 degrees Celsius to about 600 degrees Celsius in an inert atmosphere for a sufficient time to substantially remove the binder/resin 25;

(d) substantially reducing 44 oxide impurities present in the green body by heating under vacuum;

(e) placing the green body 44 in an inert gas atmosphere and elevating the temperature of the green body to a temperature sufficient for sintering to progress; and (f) soaking 46 the green body 44 in an inert gas atmosphere at a temperature sufficient for sintering to progress for sufficient time to yield a substantially theoretically dense sintered body 10 (i.e., a body 10 having very low total or absolute porosity, typically less than 2 percent, more typically less than 1 percent, and still more typically less than 0.5 percent; in other words, the body 10 has a very high density, typically in excess of 98 percent theoretical, more typically in excess of 99 percent theoretical, and still more typically in excess of 99.5 percent theoretical).

As detailed above, the reducing agent 23 is typically $B_4C$ and/or a free carbon additive, such as carbon black or phenolic resin, added during the powder precursor blending/mixing step 32. SiC 22 is typically present in an amount from about 2 weight percent to about 25 weight percent, and is more typically present in an amount from about 5 weight percent to about 20 weight percent.

Further, while step (f) above could be performed under elevated pressures, such as in a hot isostatic press, such pressures are unnecessary if the level of oxide impurities present in the green body is sufficiently reduced.

EXAMPLE 1

A $ZrB_2$—SiC composite composition may be formed as having 20 weight percent SiC, 3 weight percent carbon derived from phenolic resin (which also acts as a binder), and the remainder $ZrB_2$. The composition may be dispersed in a MEK liquid medium and ball milled for 24 hours with WC media so as to be thoroughly mixed. The mixed slurry may be dried to yield a mixed powder, and the recovered powder may be ground and sieved to a predetermined desired particle size distribution. A portion of the sieved powder may then be formed into a green body via uniaxial pressing followed by cold isostatic pressing. The green body may then be heated to about 600 degrees Celsius in flowing argon and held at that temperature for 4 hours to volatilize and evolve gasses produced through resin decomposition. The green body may then be heated to 1650 degrees Celsius in a partial vacuum and held there for up to 6 hours to volatilize boron oxides and react any other oxide impurities with the reducing agent; such impurities are reduced by the carbon and form refractory compounds such as ZrC or leave the green body as evolved gases such as $SiO$, $CO_2$ and $CO$ gas. The green body (now the reduced body or partially sintered body) is then heated to 2100 degrees Celsius in flowing Argon and held there for 4 hours to yield a substantially theoretically dense sintered $ZrB_2$—SiC composite body with whisker-like SiC inclusions in a $ZrB_2$ matrix.

EXAMPLE 2

A $ZrB_2$—SiC composite precursor composition may be formed as having 15 weight percent SiC, 2 weight percent carbon black, 2 weight percent organic binder, 3 weight percent $B_4C$, and the remainder $ZrB_2$. The starting composition may be dispersed in a MEK liquid medium and ball milled for 24 hours with WC media so as to be thoroughly mixed. The slurry of the mixed powders may be dried to yield a mixed powder with binder, and the recovered powder may be ground and sieved to a predetermined desired granule size distribution. A portion of the sieved granules may then be formed into a green body via cold isostatic pressing. The green body may then be heated to about 400 degrees Celsius in flowing argon and held at that temperature for 4 hours to decompose and volatilize the binder. The green body may then be heated to 1650 degrees Celsius in a partial vacuum and held there for 4 hours to remove volatile boron oxides and to react the remaining oxide impurities with the carbon and $B_4C$; such impurities are reduced by the carbon and/or $B_4C$ to form refractory compounds such as $ZrB_2$ and ZrC or leave the green body as evolved gases such as $SiO$, $CO_2$ and $CO$ gas. The green body (now the reduced body or partially sintered body) is then heated to 2050 degrees Celsius in flowing Argon and held there for 4 hours to yield a sintered $ZrB_2$—SiC composite body having a porosity of less than 0.5 percent/density of greater than 99.5 percent of theoretical and containing substantially evenly dispersed SiC particles in a $ZrB_2$ matrix.

EXAMPLE 3

A $ZrB_2$—SiC composite composition may be formed as having 10 weight percent SiC, 3 weight percent carbon, 2 weight percent organic binder, and the remainder $ZrB_2$. The initial composition may be dispersed in a MEK liquid medium and ball milled for 24 hours with WC media so as to be thoroughly mixed. The slurry of the mixed powders may be dried to yield a mixed powder with binder, and the recovered powder may be ground and sieved to a predetermined desired granule size distribution. A portion of the sieved granules may then be formed into a green body via cold isostatic pressing. The green body may then be heated to about 350 degrees Celsius in flowing argon and held at that temperature for 4 hours to decompose and volatilize the binder. The green body may then be heated to 1650 degrees Celsius in a partial vacuum and held there for 6 hours to volatilize any boron oxides and to react any other oxide impurities with the reducing agent additive; such impurities are reduced by the additive to form refractory compounds such as $ZrB_2$ or ZrC or leave the green body as evolved $SiO$, $CO_2$ and $CO$ gas. The green body (now the reduced body or partially sintered body) is then heated to 2050 degrees Celsius in flowing Argon and held there for 4 hours to yield a sintered $ZrB_2$—SiC composite body with a total porosity of less than about 1 percent.

EXAMPLE 4

A $ZrB_2$—SiC composite composition may be formed from the power mixture of 19.1 weight percent Si, 18.8 weight percent $B_4C$, and 62.1 weight percent Zr. In addition to the above starting powders, 4 weight percent carbon black and 2 weight percent organic binder may be added, based on the total weight of the combined starting powders. The composition may be dispersed in hexane liquid medium and ball milled for 24 hours with WC media so as to be thoroughly mixed. The slurry of the mixed powders may be dried to yield a mixed powder with organic binders, and the recovered powder may be ground and sieved to a predetermined desired granule size distribution. A portion of the sieved granules may then be formed into a green body via uniaxial pressing followed by cold isostatic pressing. The green body may then be heated to about 350 degrees Celsius in flowing argon and held at that temperature for 4 hours to decompose and volatilize the binder. The green body may then be heated to 1650 degrees Celsius in a partial vacuum and held there for 6 hours to react the Si, Zr, and $B_4C$. Any present $B_2O_3$ should volatilize under these conditions. Likewise, other oxide impurities, such as $ZrO_2$ and/or SiO, should react with the present carbon reducing agent additive to form refractory compounds such as ZrC and/or SiC or leave the green body as evolved SiO, $CO_2$ and CO gas. The green body (now the reduced body or partially sintered body) is then heated to 2100 degrees Celsius in flowing Argon and held there for 4 hours to yield a substantially theoretically dense sintered $ZrB_2$—SiC composite body.

EXAMPLE 5

A $ZrB_2$—SiC composite composition may be formed as having 20 weight percent SiC, 2 weight percent phenolic resin, 15 weight percent WC (such an addition may be made intentionally as a powder or as a calculated level of WC imparted during particle size reduction and mixing steps), and the remainder $ZrB_2$. The $ZrB_2$ powder may be reduced in size by attrition milling using WC media and a WC spindle. The milled $ZrB_2$ powder would then be mixed with the SiC and phenolic resin by dispersing in a hexane liquid medium and ball milled for 24 hours with WC media so as to be thoroughly mixed. The slurry of the mixed powders may be dried to yield a mixed powder with resin, and the recovered powder may be ground and sieved to a predetermined desired granule size distribution. A portion of the sieved granules may then be formed into a green body via uniaxial pressing followed by cold isostatic pressing. The green body may then be heated to about 500 degrees Celsius in flowing argon and held at that temperature for 4 hours to carbonize the resin. The green body may then be heated to 1450 degrees Celsius in a partial vacuum and held there for 6 hours to volatilize any boron oxides and then heated to 1850 degrees Celsius and held there for 6 hours to react any other oxide impurities with the reducing agent additives; such impurities are reduced by the additive to form refractory compounds such as ZrC and/or W-containing solid solutions of those compounds or leave the green body as evolved W-oxides, SiO, $CO_2$ and CO gas. The green body (now the reduced body or partially sintered body) is then heated to 2050 degrees Celsius in flowing Argon and held there for 4 hours to yield a substantially theoretically dense sintered $ZrB_2$—SiC composite body.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

What is claimed is:

1. An oxide-free zirconium diboride composite body system, comprising a composite body including from about 1 weight percent to about 25 weight percent SiC whiskers substantially homogeneously distributed in a $ZrB_2$ matrix, an ambient temperature of about 2050 degrees Celsius, and a flowing inert gas environment enveloping the composite body, wherein the composite body is free of oxygen.

2. A $ZrB_2$ composite system, comprising:
   a $ZrB_2$ matrix;
   between about 1 weight percent and about 25 weight percent SiC particles substantially homogeneously distributed in the $ZrB_2$ matrix and defining a composite body;
   an ambient temperature of about 2050 degrees Celsius;
   an ambient pressure of about 1 atmosphere;
   wherein the composite body is in an oxygen free environment;
   wherein the composite body is free of oxygen; and
   wherein the composite body is more than 99.5 theoretically dense.

3. The $ZrB_2$ composite system of claim 2 wherein the oxygen free environment is an inert atmosphere.

4. The $ZrB_2$ composite system of claim 2 wherein the oxygen free environment is a reducing atmosphere.

5. The $ZrB_2$ composite system of claim 2 wherein the SiC particles are whiskers.

\* \* \* \* \*